Dec. 10, 1929.  H. C. MATTHEWS  1,738,838
CAMERA
Filed May 31, 1927  2 Sheets-Sheet 2
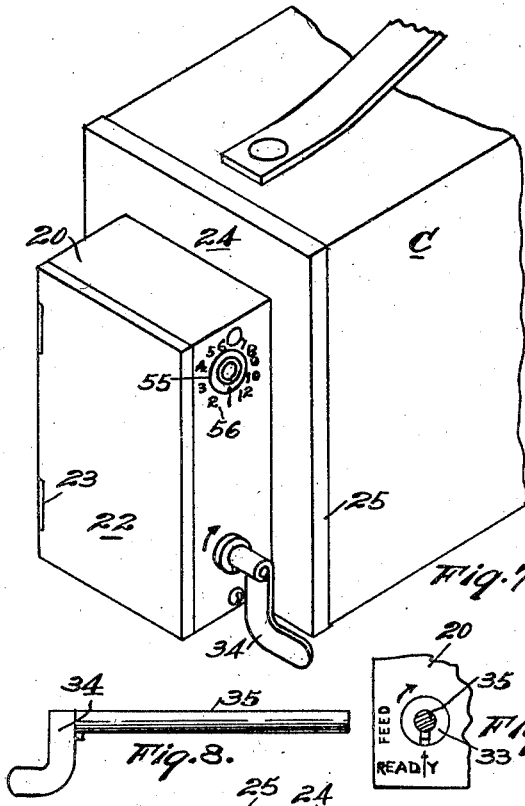
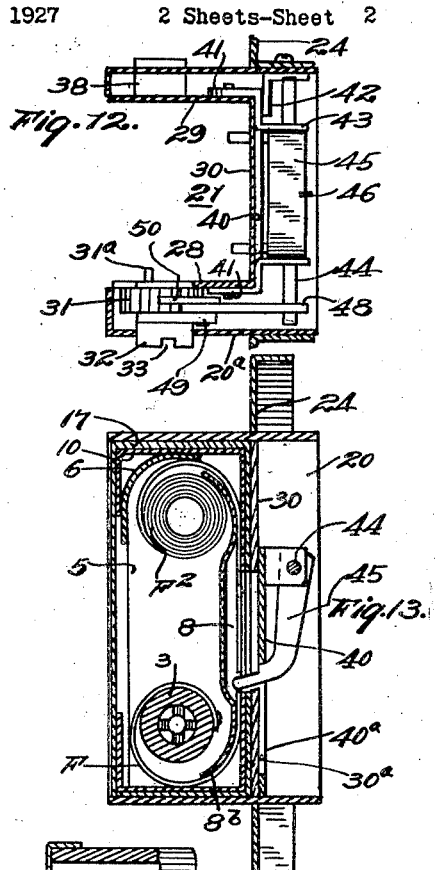
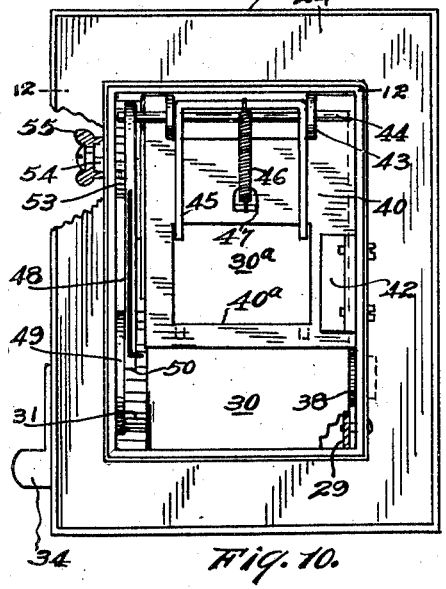
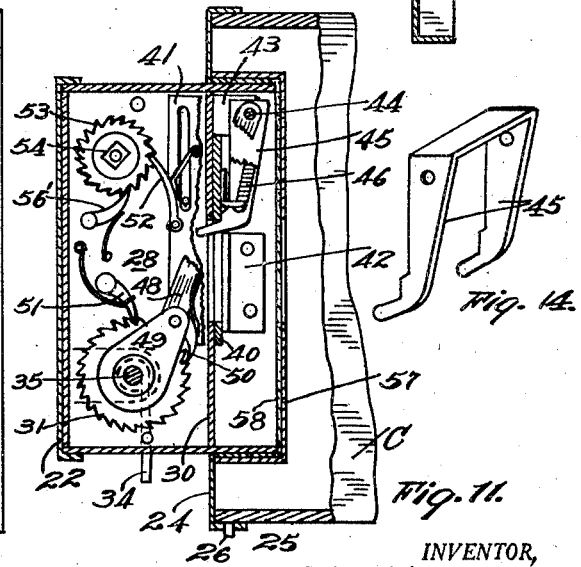
INVENTOR,
H.C. Matthews;
BY F.E. Maynard.
ATTORNEY.

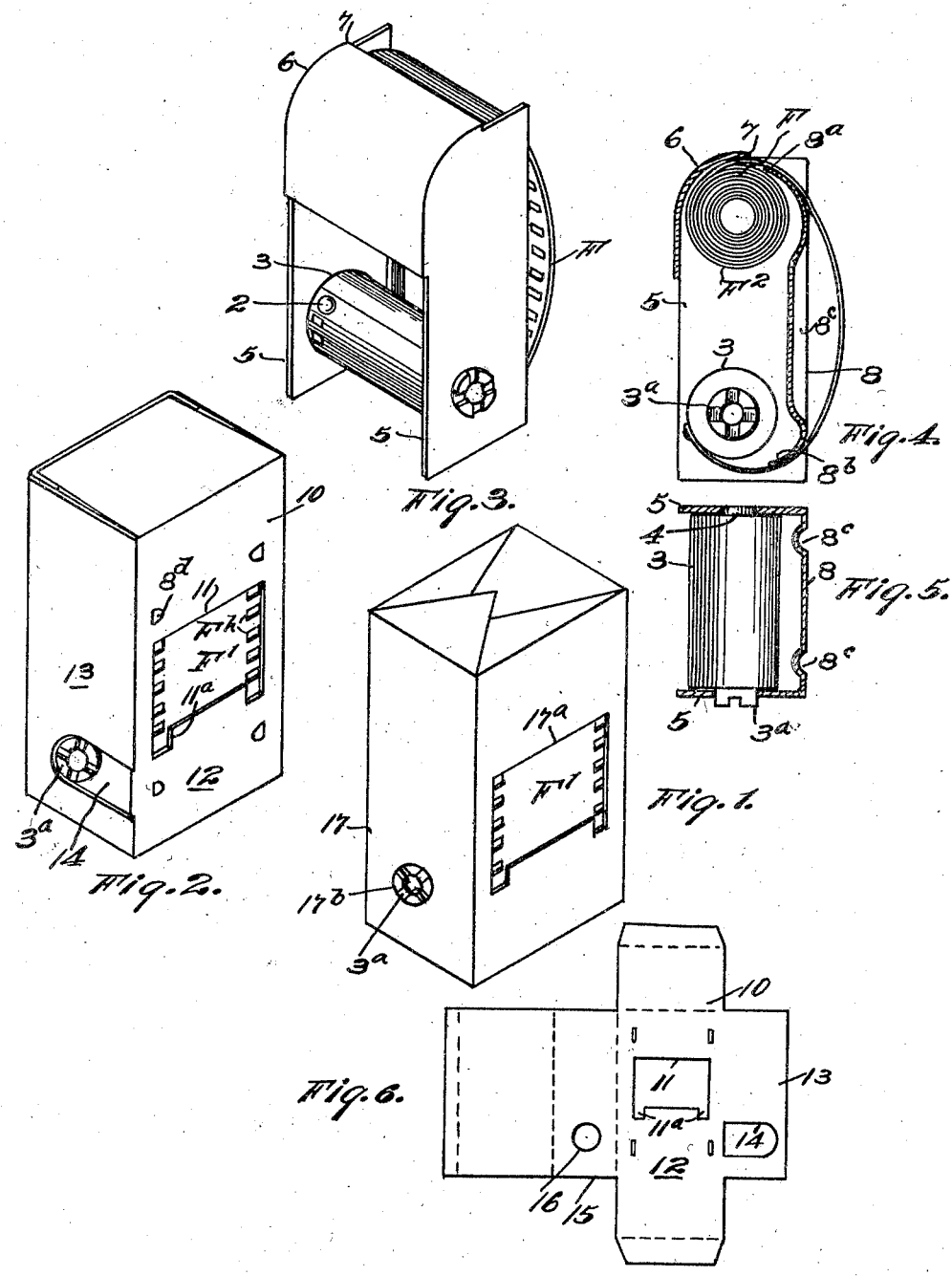

Patented Dec. 10, 1929

1,738,838

UNITED STATES PATENT OFFICE

HAROLD C. MATTHEWS, OF LOS ANGELES, CALIFORNIA

CAMERA

Application filed May 31, 1927. Serial No. 195,515.

This invention relates to cameras and more particularly to small, popular types of cameras of fixed focus and used for the taking of "still" pictures on films or plates up to a maximum size determined by the size of the camera.

It is one of the objects of the present invention to provide for the utilization of the camera for the taking of "still" pictures on the successive "frames" of the standard film product commonly known as "motion picture film".

A cardinal object of the invention is to provide a means which may be readily incorporated in or attached to a camera structure whereby "frames" of a roll-pack of motion picture film can be successively brought into register with an aperture plate ready for exposure.

Another object of the invention is to provide a combined film roll-pack and a pack chamber including means for effecting a progressive shift of the "frames" to permit the exposure thereof to form a still picture at will.

An object is to provide a film roller-pack receiving and feeding means constituting a unitary attachment readily applicable to a given size camera case and in this connection an object is to provide a film roll-pack of such construction and arrangement as to form a practicable film unit package which is adaptable to the attachment.

Generally, it is an object to provide for the utilization of a section of motion picture films in a substantially sealed package forming a cartridge which is marketable as an article of manufacture ready for insertion into a complementary cartridge chamber having a means for effecting a progressive shift of the "frames" of the strip of film and, an object is to provide a cartridge receiving chamber having means to engage the film of the cartridge while still contained and sealed in its jacket whereby to unfurl or unroll the fresh film from one end of its package and concurrently cause the rolling or wrapping of the exposed end of the film and permitting only the exposure of a "frame" lying between the fresh roll and the exposed wrap.

Figure 1 is a perspective of the complete roll-pack or cartridge of the motion picture film encased in its jacket.

Figure 2 is a perspective showing the roll-pack box without its sealing jacket.

Figure 3 is a perspective of the cartridge shell showing the exposed film receiving roller and the attached dead end of its film.

Figure 4 is a vertical section of the pack shell between the sides thereof.

Figure 5 is a transverse section of the shell from side to side.

Figure 6 is a plan of the pack box blank.

Figure 7 is a perspective of a fragment of the rear end of a hand camera showing the improved motion picture film chamber thereon.

Figure 8 is a side elevation of the unmounted actuating stem of the device.

Figure 9 is an elevation of a fragment of the film roll chamber and showing the stem in cross section as interkeyed with a rotary bearing.

Figure 10 is an inside face view of the rim wall of the chamber and its associated actuating mechanism.

Figure 11 is a vertical section from front to rear of the pack receiving chamber as mounted on the camera case.

Figure 12 is a cross section about on line 12—12 of Fig. 10.

Figure 13 is a vertical section from front to rear and through the inserted film roll shell.

Figure 14 is a perspective of the film feeding pawls.

The film roll-pack or cartridge of the present invention includes a section of motion picture film F the length of which may be varied up to maximum capacity of a given size package and one end of the film F is shown as secured by tacks 2, or otherwise, to a receiving roller 3 on which the exposed film is adapted to be wrapped by rotation of the roller from time to time following an exposure of a "frame" F'. The roller 3 has a shaft 4 whose ends are mounted in respective bearing holes in opposite side cheeks 5 of what is here called a "shell" having at one end a curved end wall 6 terminating at 7 somewhat above and spaced from the contiguous lip 8ª of an inner platen 8, whose opposite end has an inwardly curved guide flange 8ᵇ. There is formed between the end wall 6 and the inward lip 8ª an ample magazine space to receive a roll F² of film F in fresh or unexposed condition and from this roll F² the leading end of the film is, in the process of manufacture, drawn across the platen 8 and over the flange 8ᵇ and secured as above stated at 2 to the wrapping roller 3.

One end of the roller 3 is provided with a clutch or coupling device 3ª of any suitable character and which has an end-grooved hub projecting slightly from the shell cheek 5 so as to be readily interlocked with a complementary actuating means. Following the mounting of the film roll F² and the connection of the leading end of the film to the roller 3, in course of manufacturing a package box blank 10, Fig. 6 is folded about the loaded shell so as to substantially encompass the shell end film as shown in Fig. 2 excepting that the leading end of the film F has one "frame" F' in register with a box window 11 in the bottom 12 of the box; one of the side flaps, as 13, being provided with a hole 14 for the clutch hub 3ª of the roller 3. An opposite box wall 15 has a hole 16 to clear the shaft end 4. The window 11 of the box 10 has clearance slots 11ª at opposite corners for the clearance of a feeding device which will be described in detail hereinafter and the platen 8 is shown in Fig. 5 as having channels or grooves 8ᶜ also for the complementary feeding means.

The box 10 is preferably made of a substantial opaque material such, for instance, as black cardboard and the applied box is finally closely encased in an opaque jacket 17 of any suitable pattern or design and which is provided with a "frame" hole 17ª to correspond wth the "frame" hole 11 and also has a clearance hole 17ᵇ for the clutch hub 3ª of the roller 3. The parts just above described therefor constitute a simple, practicable, substantial and efficient light-tight package clearly illustrated in Fig. 1 in which a fresh or unexposed film F is concealed and protected in its roll form F², substantially only one "frame" F' being lost by reason of its juxtaposition and exposure at the box window where it overlies the platen 8; it being understood, of course, that the end of the film attached to the roller 3 is also lost for utility in the camera.

The package forms a container in which the film is sealed light-tight; is closely guided along its sides; is advanced to exposure position and is then re-coiled, all in the one package.

For the utilization of the above disclosed film roll package, I have constructed and employed means in association with a popular small sized camera a portion of which is indicated at C, Fig. 7. It is understood that the film roll receiving means may be incorporated as a fixed structure in the camera C or may be constructed and arranged to be readily applied thereto as an attachment when the usual camera back has been removed.

In the present case, the cartridge receiving means is indicated as a unitary attachment. It includes a chamber 20 internally constructed and arranged to form a recess 21, Fig. 12, into which the complete film roll cartridge is adapted to be bodily inserted as shown in Fig. 13, and then covered by an end cap or cover 22, which may be hinged at 23 to a wall of the chamber 20. This chamber, in the illustrated embodiment, has a face plate 24, provided with a marginal frame forming flange 25, which is adapted to closely slip on to the rear end of the camera case C, which latter in some forms of instruments is provided with dowel pins 26 to enter respective holes provided in the adjacent frame flange 25; though obviously, the chamber may be mounted and secured on the camera in any appropriate manner. Rigidly secured in the chamber 20, is an inner receiver including a side wall 28, and an opposite side wall 29, and an inner fixed aperture plate 30, Fig. 12, against which the inserted cartridge will rest closely so that the initial, dead "frame" of the film will register with the plate aperture 30ª, Fig. 10.

Between the receptacle wall 28 and the wall 20ª of the chamber 20, there is formed a cavity in which there is disposed a ratchet wheel 31, whose outer end has a hub 32 with a key slot 33 to receive a key 34 which is provided on a stem 35, Fig. 8, which latter passes in through the ratchet 31 across the chamber space 21 so as to enter the bore of the roller 3. The stem is pulled outwardly so as to release a mounted roller 3 and allow its removal from the chamber space 21 and allowing the insertion of a fresh pack.

The inner end of the ratchet 31 has a pin or dog 31ª to readily interlock with the clutch hub 3ª of a film roll-pack as this is inserted into the chamber space 21. The far side of the chamber 20 has provided therein a suitable bearing 38 for the key stem 35; the given stem serving as a means to firmly hold the inserted pack within the chamber 20 and at the same time serving as means to rotate roller 3 not only to wrap exposed film on the roller but having the further function of actuating a precision feeding device.

This feeding device includes, in the present case, a slide or carriage 40 mounted flat against the aperture plate 30 and having side flanges 41 over-lapping the side walls 28—29 of the receptacle. The slide is operatively held in place against the plate 30 by a removable clip angle 42 secured to one side of the chamber 20. The slide has upstanding spaced bearing lugs 43 receiving a cross-rod 44 extending from side to side of the casing 20 and free therein. Mounted on the cross-rod 44 is a double-arm pawl 45, a part of which is connected to a spring 46, whose opposite end is attached at 47 to the slide so that the spring is operative to pull the claws of the pawls 45 down against the slide 40 which latter is provided with a "frame" aperture 40$^a$ adapted to register with the aperture 30$^a$ of the plate 30.

Connected to one end of the rod 44, is a link 48, whose opposite end connects to a crank 49 which is rigid with the hub 32, so that when the stem 35 is turned in the direction of the arrow, Fig. 9, the claws of the pawls interhook in contiguous film holes F$^h$ to which the claws have access through the aperture 30$^a$ of the plate 30 and through the jacket 17 and box 10 of the pack. On a stroke of the pawls 45, with the slide down the plate 30 a fresh film "frame" is advanced to register with the aperture 30$^a$ and when the stem handle 37 is turned down again to the ready position, Fig. 9, the pawls 45 recede with the slide 40 and the aperture 40$^a$ registers with the aperture 30$^a$, thus preparing the "frame" of the film for exposure when the shutter of the camera C is opened in the usual manner.

Mounted on the crank 49 is a pawl 50 engaging the ratchet 31 and turning it as the pawls feed a "frame" of film. As the ratchet 31 turns, it rotates the pin 31$^a$ and this turns the roller 3 in a direction to wrap the exposed film. A click 51 engages the ratchet wheel 31 to prevent this from reversing, in action.

It is desirable to indicate what number of film "frames" may have been exposed in the camera and for this purpose the slide 40 is provided with a pawl 52, Fig. 11, to engage a ratchet 53 which is provided with a hub 54 shown in Fig. 10 as extending out through the chamber 20 and receives an index member 55 having a mark designed to register with a circle of numbers 56; the indicator 55 being given a step by step turn at each extreme movement of the pawl 52 when it strikes the ratchet wheel 53; this being checked in one direction by a click 56'. The inner end of the chamber 20 is provided with an aperture hood 57 having a transparent sheet 58.

To form a light-tight guide-way, the shell has clinch lugs 8$^d$ in the platen to hook down the aperture bottom 12, of the box 10. This prevents light from leaking in beyond the aperture.

What is claimed is:

1. A motion picture film package for use in "still" cameras, including a section of film in a roll, a shell in one end of which the roll is loosely enclosed and having a platen over which the film passes from its roll, and encasing means sealing the shell and film and having a window at the platen for exposure of the film "frames" successively.

2. A motion picture film package for use in "still" cameras, including a section of film in a roll, a shell in one end of which the roll is loosely enclosed and having a platen over which the film passes from its roll, and encasing means sealing the shell and film and having a window at the platen for exposure of the film "frames" successively, and a roller in the shell for receiving the exposed film from the platen.

3. A motion picture film package for use in "still" cameras, including a section of film in a roll, a shell in one end of which the roll is loosely enclosed and having a platen over which the film passes from its roll, and encasing means sealing the shell and film and having a window at the platen for exposure of the film "frames" successively said window providing for entry of a film engaging and feeding means.

HAROLD C. MATTHEWS.